(12) United States Patent
Williams (10) Patent No.: US 8,787,144 B2
(45) Date of Patent: Jul. 22, 2014

(54) INTERLEAVED SIGNALING

(75) Inventor: Thomas H. Williams, Longmont, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 200 days.

(21) Appl. No.: 13/538,456

(22) Filed: Jun. 29, 2012

(65) Prior Publication Data

US 2014/0003477 A1    Jan. 2, 2014

(51) Int. Cl.
*H04L 27/04* (2006.01)

(52) U.S. Cl.
USPC .......................................................... 370/208

(58) Field of Classification Search
USPC .................. 375/224, 296, 299, 260; 714/758; 370/208
See application file for complete search history.

(56) References Cited

U.S. PATENT DOCUMENTS

| | | | |
|---|---|---|---|
| 5,440,335 A * | 8/1995 | Beveridge ..................... | 725/106 |
| 6,014,235 A * | 1/2000 | Norte ............................ | 398/180 |
| 6,272,340 B1* | 8/2001 | Wright et al. ................. | 455/427 |
| 8,355,737 B2* | 1/2013 | Macnaughtan et al. ... | 455/456.1 |
| 8,396,142 B2* | 3/2013 | Heegard et al. .............. | 375/260 |
| 2003/0084283 A1* | 5/2003 | Pixton .......................... | 713/163 |
| 2004/0008617 A1* | 1/2004 | Dabak et al. .................. | 370/208 |
| 2011/0051786 A1* | 3/2011 | Schwager et al. ........... | 375/222 |
| 2011/0238930 A1* | 9/2011 | Fuchi et al. ................... | 711/154 |
| 2013/0034068 A1* | 2/2013 | Taoka et al. ................... | 370/329 |
| 2013/0129005 A1* | 5/2013 | Xia et al. ...................... | 375/295 |

\* cited by examiner

*Primary Examiner* — Mark Rinehart
*Assistant Examiner* — Peter Solinsky
(74) *Attorney, Agent, or Firm* — Great Lakes Intellectual Property, PLLC.

(57) ABSTRACT

Signal interleaving of multiple signals, such as those associated with transmissions within a high-speed data network from subscribers to the Internet or other locations, is contemplated. The transmitted signals may be interleaved by adding signals from one subscriber with those transmitted from another subscriber. The transmitted signals may include spectral holes such that when one or more spectral holes of the signal sent from one subscriber add together with signals from another subscriber, or other simultaneously transmitting device, it fills spectral holes in a manner that maximizes transmission capabilities.

20 Claims, 5 Drawing Sheets

INTERLEAVED SIGNALING

TECHNICAL FIELD

The present invention relates to interleaving signals, such as but not necessarily limited to interleaving orthogonal frequency division multiplexing (OFDM) and pulse-amplitude modulation (PAM) signaling in the frequency domain.

BACKGROUND

Pulse-amplitude modulation (PAM) signaling may be modulated using QAM (quadrature amplitude modulation) or VSB (vestigial sideband) modulation, which are well known to one having ordinary skill in the art. These and other PAM related modulation techniques include converting an input data stream into symbols that are then filtered, modulated and mixed to a desired frequency for transmission. The filtering may be used to limit the corresponding signaling bandwidth and/or to prevent inter-symbol interference (ISI). Examples of QAM signals are QPSK (quadrature phase shift keying), and N-QAM, where N is the number of points in a constellation. As the number N increases, each symbol may carry more information, or bits of data. If transmission impairments, such as high random noise or brief bursts of impulse energy are anticipated, a forward error correcting code can be applied to the transmission (this may result in more symbols being transmitted). The data of a PAM transmissions may be transmitted continuously, such as in broadcast signals or in blocks.

PAM signals may be contaminated with linear distortions in a signal path during transmission, such as from echoes, group delay and other factors. Linear distortions create inter-symbol interference, which can cause errors in the transmission, or in severe cases, cause the transmission to be unintelligible. Linear distortions may be removed by an adaptive equalizer structure, such as a FIR (finite impulse response) filter, or IIR (infinite impulse response filter). The adaptive equalizer may be located at the receiver or at the transmitter and/or a transceiver may include capabilities to facilitate equalizing in both receiving and transmitting directions. If the equalizer is located at the transmitter it must have knowledge of the linear distortion in the transmission path, and the technique is called "pre-distortion".

OFDM (orthogonal frequency division multiplexing) block transmissions are also well-known in the art. With OFDM block transmissions, the symbols to be transmitted are converted with an IFFT (inverse fast Fourier transform). This creates component subcarriers from symbols. Received OFDM signals may be comprised of a single signal from a single transmitter, or by a composite signal comprised of OFDM signals from multiple simultaneous transmitters. In the latter case the modulation technique is known as orthogonal frequency division multiple access (OFDMA). OFDM transmissions are sent in individual blocks, or streams of blocks that may be contiguous. OFDM signals may also become contaminated by linear distortions.

A guard interval (a.k.a. cyclic prefix) may then be added to OFDM and PAM transmissions by copying symbols from the end of the block transmission and pasting them on to the front of the block transmission. If the guard interval is longer than the longest echo in the channel, the effects of the echo can be removed at the receiver using frequency domain equalization. OFDM signals may be equalized at the receiver by a single complex multiplication of each subcarrier by a correction number (typically complex), provided the duration of the echo is shorter than the duration of the guard interval. At the receiver, the PAM block transmission may be converted into the frequency domain where linear distortion is removed with a single complex multiplication on each subcarrier.

OFDM and QAM signals, being very different in how they are created, have different characteristics for transmission. OFDM signals have a disadvantage of a high crest factor (peak to average power ratio), but have an advantage that the loss of a few component subcarriers in the frequency domain can be tolerated if component subcarriers are coded using a FEC (forward error correction). QAM signals have an advantage of a lower crest factor, and can tolerate a short duration disruptive temporal noise burst if a forward error correcting code is used. Thus, using FEC, OFDM can tolerate some missing component subcarriers (which can be caused by an impairment in the frequency domain, such as an interfering carrier), and QAM can tolerate some missing symbols (which can be caused by an impairment in the time domain, such as a short burst of noise).

A cable operators utilizing hybrid fiber coax (HFC) plant may desire extending the digital transmission capability of their plant. One option contemplated by the present invention is to change a frequency split from a 5-42 MHz upstream and 54-860 MHz downstream split to a 5-200 MHz upstream and 250-860 MHz downstream split and another contemplated option is to use bandwidth above 900 MHz for upstream and/or downstream signals.

A wide, high-bandwidth carrier is desirable for transmitting signals because it can provide a simpler MAC (media access control) layer. A wide bandwidth PAM transmission has a very short symbol duration, which creates a problem with a FIR (finite impulse response) equalization circuit in this type of option. For example, an echo may be 2 microseconds in duration, but the symbol rate could be as short as 5-10 nanoseconds. With PAM, this would require a FIR filter structure with more than 600 taps (digital filter) running with a high clock rate, which may not cost be effective. (A digital filter tap may be distinguished from a plant tap. The digital filter taps are part of a digital filter and may are implemented as gates in a silicon chip whereas the plant taps may be a physical device connected to the coax with 4 ports (typ.))

The present invention contemplates the use of OFDM as a solution to this problem. Unfortunately, OFDM has a high crest factor, which creates a need for an expensive high-powered transmitter to generate the required transmit power, particularly for the above 900 MHz option where coaxial cable attenuation may be high.

In a tree and branch architecture used by cable, some subscribers will have low cable attenuation, and some will have high cable attenuation. The subscribers with high cable attenuation will require higher transmit power, which may cause the high crest factor of OFDM to be a disadvantage for those subscribers such that PAM is preferred. Subscribers with low cable attenuation can take advantage of the low-noise signal path by using high-order modulation symbols which carry more bits per symbol. Thus, the present invention contemplates a need for a transmission system that can produce a low crest factor signal (PAM), allows simultaneous transmissions (both), has as short a guard interval as the signal path allows (both), has simple efficient equalization, (both) and uses high order modulation if the signal path allows (both). This need applies equally to cable plants, wireless or non-cable plants and other area where the characteristics of transmission mediums (a.k.a. signal paths) used by multiple subscribers varies from subscriber to subscriber

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
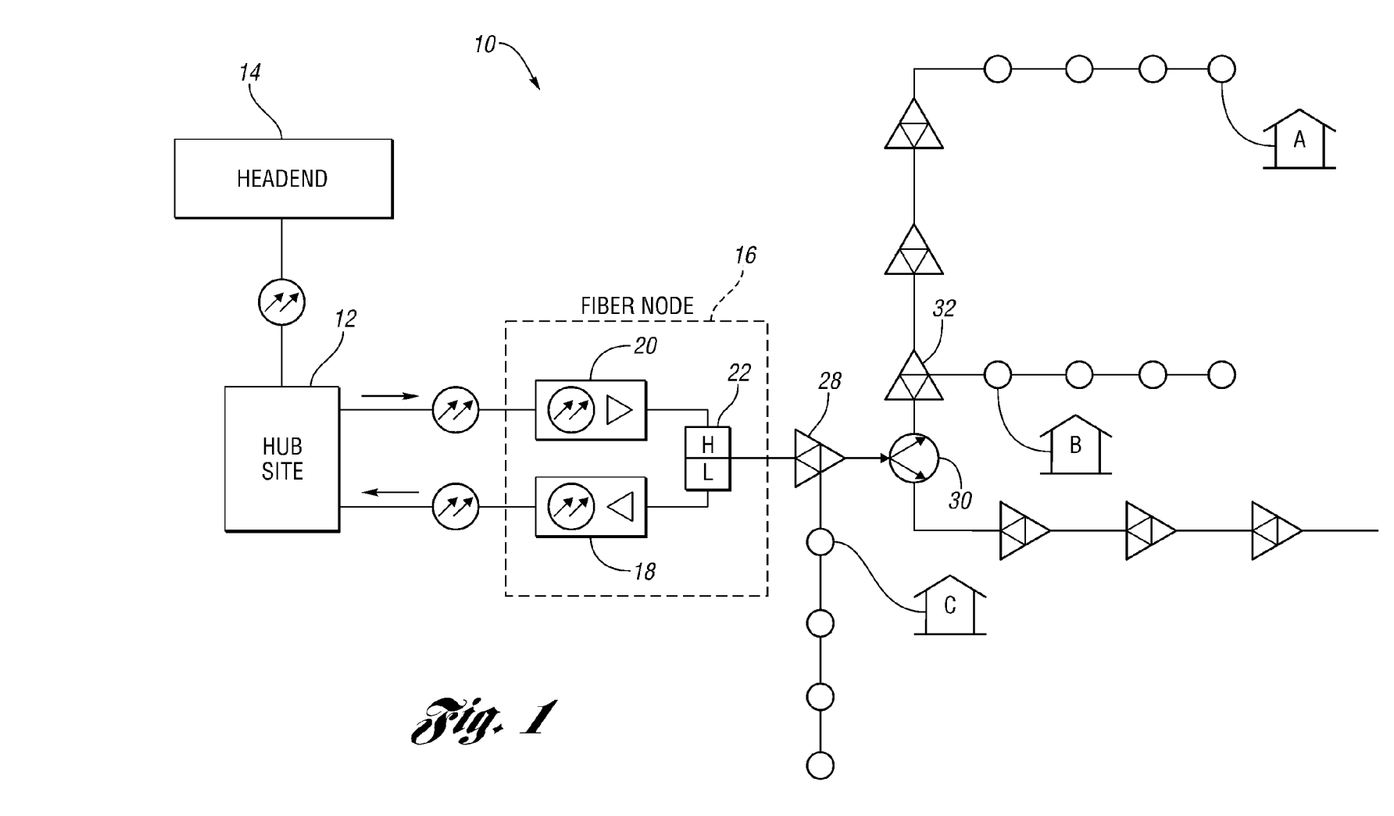
FIG. 1 illustrates a system for interleaving signals as contemplated by one non-limiting aspect of the present invention.

FIG. 1 illustrates a system 10 for interleaving signals as contemplated by one non-limiting aspect of the present invention. The system 10 is described for exemplary non-limiting purposes as a hybrid fiber coax (HFC) network such as but not necessary limited to one associated with a cable network having capabilities to provide efficient high-speed data services. The present invention is not necessarily limited this embodiment and fully contemplates its use and application in other systems, particularly wireless systems, cellular systems and other non-cable systems. The illustrated HFC network describes one use of a tree and branch configuration where a hub site 12 and a headend 14 or the Internet backbone facilitate Internet access or other data transmissions for a plurality of subscribers A, B, C. While a single hub site 12 is shown, the present invention fully contemplates additional fiber optic and/or coaxial cable lines cooperating with the headend 14 or other entities to support multiple hub sites in a large metropolitan HFC network.

In this exemplary illustration, from the hub site 12, bidirectional fiber optic communications may be facilitated with a fiber node 16. The fiber node 16 is shown to be configured with separate fibers for upstream 18 and downstream 20 communications, or using different wavelengths utilized on a same fiber optic cable. The fiber node 16 may be located in a neighborhood and serves 100 to 500 homes, for example. The fiber node 16 may include an optical to electrical converter to convert downstream traffic to an electrical signal (the downstream traffic may typically be in the range of 54 to 860 MHz) and an electrical to optical converter to convert upstream signals (the upstream traffic may typically be in the range of 5 to 42 MHz) into optical signals. The fiber node 16 may include a diplex filter 22 or other sufficiently configured device to facilitate diverting signals between the upstream and downstream signaling path and a common medium, such as but not necessary limited to a coaxial cable, used to facilitate single transport with the subscribers.

The signals may travel over a coaxial cable for a relatively short distance transported between the subscribers or the subscriber's homes A, B, C and the fiber node 16. One non-limiting aspect of the present invention contemplates facilitating this type of two-way communication capabilities with the transported signals being interleaved. The signal interleaving contemplated by the present invention may be suitable for use with both upstream and downstream traffic. The present invention contemplates a transmission system that can produce a low crest factor signal (PAM only), allows simultaneous transmissions, has as short a guard interval as the signal path allows, has simple efficient equalization, and uses high order modulation if the signal path allows. The present invention may apply equally to cable plants, wireless or non-cable plants and other area where the characteristics of transmission mediums used by multiple subscribers varies from subscriber to subscriber The signals exchanged between the fiber node 16 and the various subscribers A, B, C may travel different distances depending on a relative positioning of the subscriber A, B, C to the fiber node 16. Subscriber A may be located a first distance away from the fiber node 16, subscriber B may be located a second distance away from the fiber node 16 that is less than the first distance, and subscriber C may be located a third distance away from the fiber node 16 that is less than the second distance. (The distance is measured by a signaling path length relative to the fiber node 16 as opposed to geographical positioning of the subscriber.) A plurality of amplifiers may be included to facilitate establishing the tree and branch arrangement (amplifiers are needed to boost the signal). The amplifiers may contain diplex filters inside of two-way amplifiers having capabilities sufficient to separate the bands (e.g., upstream and downstream signaling) to facilitate amplification, such as but not necessarily limited to the amplifier associated with U.S. patent application Ser. No. 13/372,906, the disclosure of which is hereby Incorporated by reference in its entirety.

A plurality of taps (subscriber access point to a medium) may be included to facilitate connecting subscriber locations to the various branches. The taps may be configured to allow upstream and downstream signals to be extracted from (and inserted into) a hard line coaxial cable and fed to end points in homes through flexible cables. One or more of the amplifiers may be configured as a combiner or other type of device to facilitate splitting/combining the various branches. A first combiner 28 may be included to branch a first line extending from the fiber node into a second and third line where a second combiner 30 branches the second line into third and fourth lines from which a third combiner 32 branches the third line into fifth and sixth lines (does this refer to a figure?).

One non-limiting aspect of the present invention contemplates maximizing and/or increasing high-speed data capacity, such as by extending bandwidth of a cable plant and/or and modifying frequency splits. In particular, one non-limiting aspect of the present invention contemplates using the bandwidth above 860 MHz. The problem with use of such a bandwidth is that the attenuation of the cable lines is large, so distant endpoints, such as home A may have large cable attenuation and nearby endpoints, such as home C may have low cable attenuation. Because the transmit power is constrained, distant homes will have a lower received carrier to noise power ratio. This forces the use of low-order modulation, and resulting lower data rates for distant end points.

Figure 2A:
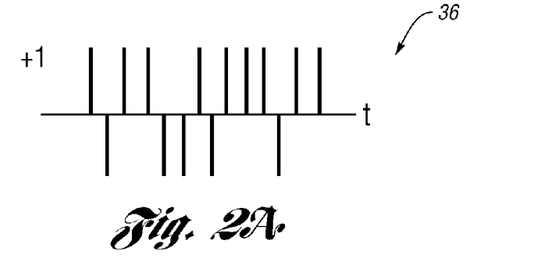
FIGS. 2a-2b is a PAM signal's symbols as viewed in both the time domain (FIG. 2a) and the frequency domain (FIG. 2b).
Figure 2B:
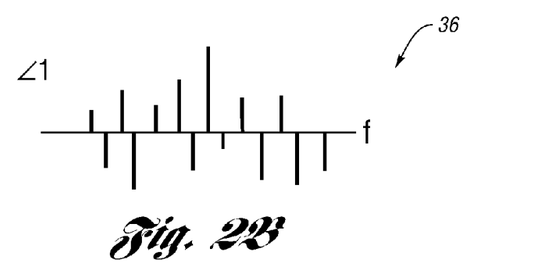

FIGS. 2a-2b is a PAM signal's symbols 36 as viewed in both the time domain (FIG. 2a) and the frequency domain (FIG. 2b). The signals may correspond with those transmitted from one of the subscribers for transmission over one of the branches, e.g., from a subscribers computer through a cable modem for delivery through the system. The corresponding signals may be converted with the cable modem or other suitable device positioned near the entry tap into symbols in the time domain and transmitted. Optionally, the symbols may be filtered (not illustrated) to constrain bandwidth and eliminate intersymbol (ISI) interference. If the symbols are viewed in the frequency domain, by for example, a vector signal analyzer using a FFT (fast Fourier transform) on a captured time trace, the signal will be constrained in bandwidth due to the above-mentioned filtering. Only the real components have been plotted since the data symbols contain real and imaginary components, both in the time domain and in the frequency domain, where the imaginary components look similar to the real components.

Figure 3A:
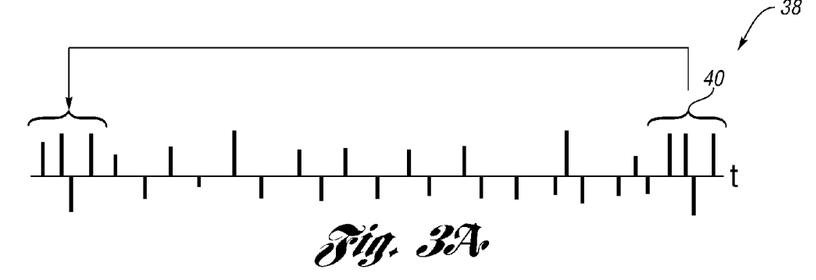
FIGS. 3a-3b illustrate a PAM signal in the time and frequency domains that has been modified to create spectral holes as contemplated by the present invention.
Figure 3B:
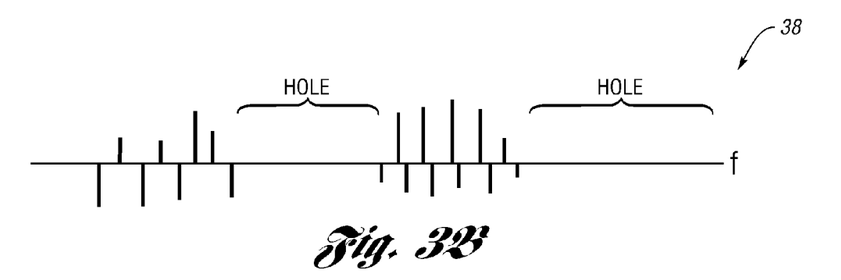

FIGS. 3a-3b illustrates a PAM signal 38 in the time and frequency domains that has been modified to create spectral holes as contemplated by the present invention. A set of symbols (FIG. 3a) is shown to be converted into the frequency domain using a FFT (FIG. 3b). In the frequency domain, the component subcarriers may be relocated from their original frequencies to new frequencies to create one or more spectral holes. For example, assume the symbol rate is 100 megaSymbols per second and the transmission block size is 4096 symbols. This yields a block duration of 4.096 microseconds (1/100E6 times 4096). When converted into the frequency domain, 4096 frequency component subcarriers will be located every 24.414 kilohertz. These 1024 component subcarriers, occupying a bandwidth of 100 MHz can be spread-out by a factor, such as two, to create a 200 MHz wide transmission with 50% of the spectrum being vacant.

The spread-out transmission is next converted back into the time domain using an IFFT (inverse fast Fourier transform). for transmission Since the number of component subcarriers has doubled from 4096 to 8192, the duration of the transmission also doubled to 8192 symbols occupying 8.092 microseconds. A guard interval 40, or cyclic prefix, may be created for the transmission by copying and pasting a number of symbols from the end of the transmission block to the start of the transmission block. The duration of the guard interval may be dynamically selected according to echo path length or other influence on signal path of the transmitting subscriber such that the guard interval is selectively increased and/or decreased on a per transmission or per subscriber basis to be slightly longer than the duration of the longest echo in the channel. The headend 14 or other device associated with the system may be configured to test the signaling path, such as with a ranging operation, to assess the echo or other influences sufficient to facilitate adjustment of the card interval.

Figure 4A:
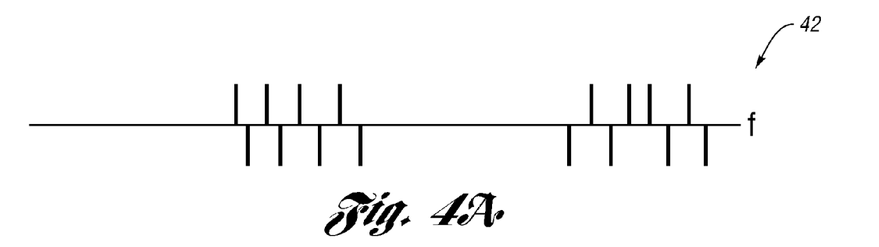
FIGS. 4a-4b illustrate an OFDM signal in the time and frequency domains that has also been modified to create spectral holes as contemplated by the present invention.
Figure 4B:
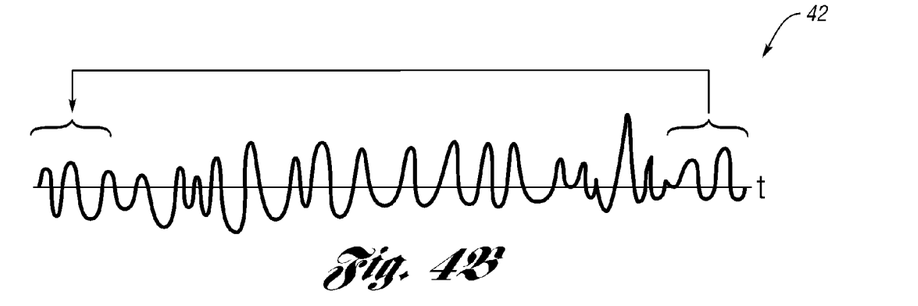

FIGS. 4a-4b illustrate an OFDM signal 42 in the time and frequency domains that has also been modified to create spectral holes as contemplated by the present invention. Using the same numerical example as above, assuming that 2048 component subcarriers will be created with a spacing of 24.414 kilohertz. These component subcarriers (FIG. 4a) may be created in the frequency domain and placed in spectral holes created in FIG. 3b. Values of 0 may be used for the remaining component subcarriers, which are used by other transmitters. An IFFT may be used on the OFDM symbols to create a signal for transmission. Since the number of symbols in the time and frequency domain is 8192, the duration of the transmission will also be 8.196 microseconds. A same-duration (as illustrated in FIG. 3a) guard interval may be created by cutting and pasting symbols from the end of the block to the front of the data block.

Figure 5A:
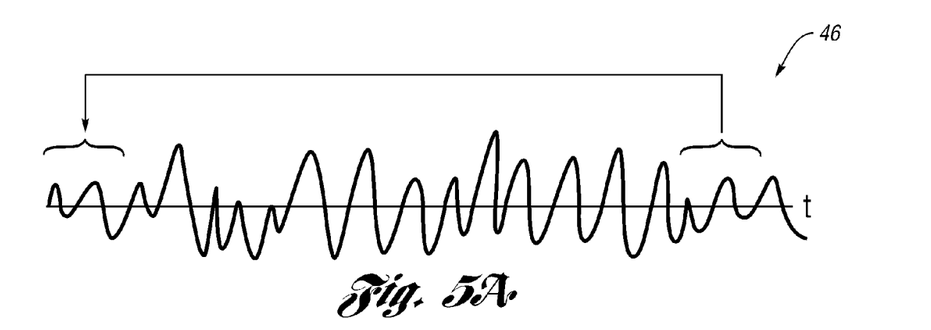
FIGS. 5a-5b illustrate a linear addition of the time and frequency traces illustrated of FIGS. 3a-3b and 4a-4b as contemplated by the present invention.
Figure 5B:
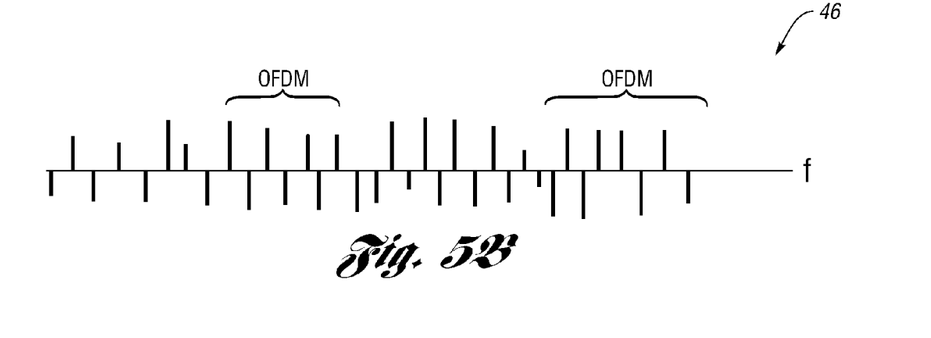

FIGS. 5a-5b illustrate a linear addition 46 of the time and frequency traces illustrated of FIGS. 3a-3b and 4a-4b as contemplated by the present invention. In this manner, the present invention contemplates the spectral holes created within signals from one subscriber using PAM being filled by the component subcarriers from another subscriber using OFDM. Returning to FIG. 1, the PAM signals having spectral holes may correspond with subscriber A and the OFDM signals having spectral holes may correspond with subscriber B. The signals issued from subscriber A and subscriber B may be linearly added at the first upstream combiner. The signals issued from subscribers A and B or other simultaneously transmitting subscribers may be added together in a similar manner at the same combiner or at other combiners associated with intersecting signals. For example, if subscriber C were to be scheduled by the headend to fill one or more of the spectral holes within the signals of subscribers A and/or B, the subscriber C signals may be linearly added to the already linearly added subscriber A and subscriber B signals at the combiner. Holes may be dynamically created by a scheduler at the headend.

In this manner, the subscriber gateways or other features used to access the taps may be instructed by the headend 14 to or other suitable device within the system to schedule signal transmissions such that the transmitted signals add together at to create and fill spectral holes. The headend 14 may include the scheduler or other device having capabilities sufficient to instruct each subscriber's terminal when to transmit signals and how to transmit the signals in order to facilitate the contemplated combining operations, i.e., to ensure the signals are added together to fill the desired spectral holes. As additional subscribers require communications, the headend may adjust the number and/or timing of the spectral holes included within the signals of others subscribers in order to facilitate adding the corresponding signals in a manner that maximizes transmission capabilities of the system. In particular, the present invention contemplates scheduling signal transmissions and the creative number of spectral holes within the signal transmissions according to active signaling domains of the subscribers and/or signaling demands likely to occur in the future.

The signals desired for addition may be scheduled such that the transmissions start at the same time, end at the same time, and have same-duration guard intervals. At the receiver the component subcarriers may be demodulated, separated by transmitter/subscriber, and separately equalized in the frequency domain to remove linear distortion, such as echoes. Separate equalization may be necessary since different subscriber transmitters, with different signal paths, may experience different linear distortions. Pilot symbols (not illustrated) are typically used for equalization training. Pilot symbols may be located on the component subcarriers in the frequency domain and transmitted infrequently. Alternately, interpolation in the frequency domain may be performed. Predistortion, where compensation for linear distortion is done at the transmitter, may also be a method to correct for linear distortions.

Thus a nearby transmitter with a good signal to noise ratio can use OFDM with its desirable transmission properties and less processing overhead, and a distant transmitter with a low signal to noise ratio can use PAM with a low crest factor to maximize signal power. Furthermore, the OFDM transmission can use FEC with additional carriers in the frequency domain and the PAM can use additional symbols in the time domain to achieve FEC in the presence of burst noise. If only one user wants to use the entire spectrum, they may use full-time OFDM or full-time PAM. If the device coordinating transmission detects that no long echoes exist on any signal path, the duration of the guard interval (which can be considered overhead) can be shortened. Thus, end points using signal paths with no long echoes can be assigned to transmit simultaneously with a short guard interval, and end points with signal paths containing long echoes can be assigned to simultaneously with longer guard intervals, i.e., endpoint transmission can be group according to attenuation, echo and other measurables. Likewise, devices with a poor signal to noise ratio can be ordered to transmit with a low modulation order (such as QPSK) and devices with a good signal to noise ration can be ordered to transmit simultaneously with a high order modulation (such as 1024 QAM).

Figure 6:
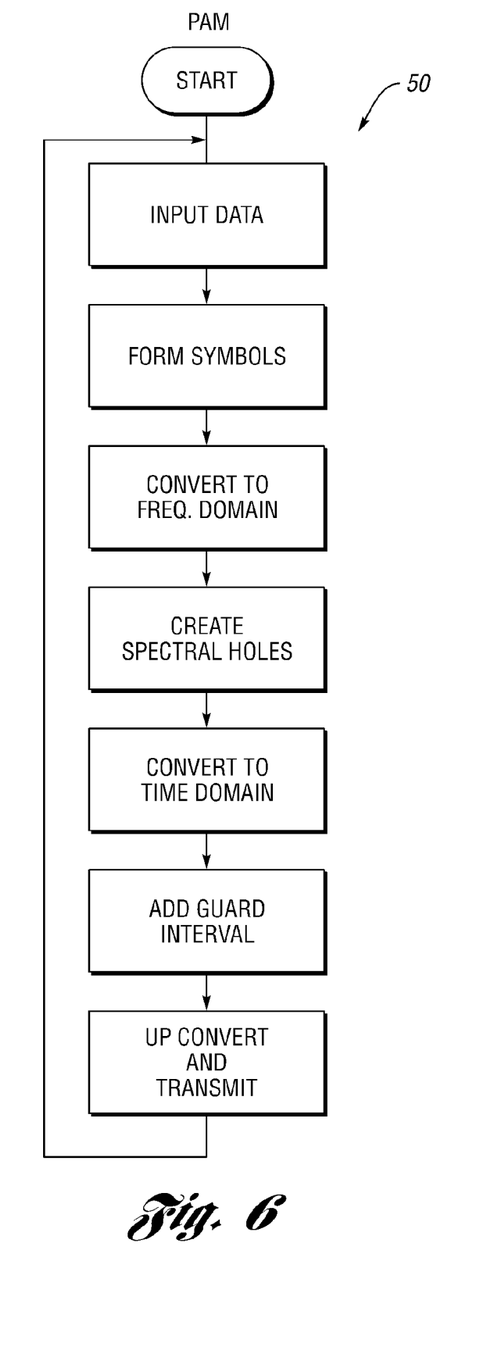
FIG. 6 is a flow diagram for PAM transmitting with spectral holes as contemplated by the present invention.

FIG. 6 is a flow diagram 50 for PAM transmitting with spectral holes as contemplated by the present invention. In a first step, data bits may be inputted and converted into symbols in a second step. Any forward error correction may also be accomplished at this step. In a third step, the symbols may be converted into the frequency domain. In a forth step spectral holes may be created by using some pre-assigned component subcarriers and not others. In a fifth step, the frequency domain symbols may be converted into the time domain and in a sixth step a guard interval may be added. Finally, in a seventh step, the complex symbols may be upconverted and transmitted. Processing is repeated at the first step.

Figure 7:
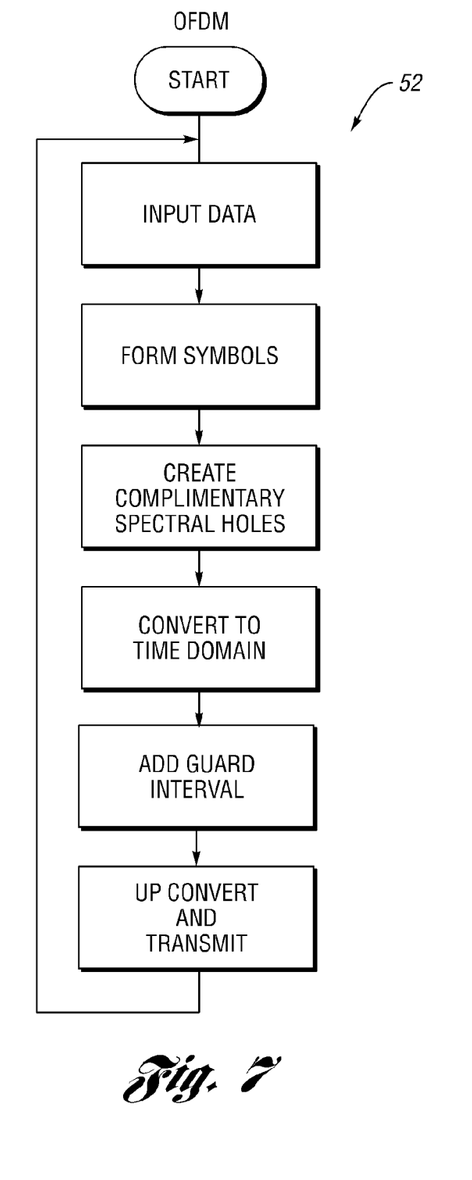
FIG. 7 is a flow diagram for OFDM transmitting with spectral holes as contemplated by the present invention.

FIG. 7 is a flow diagram 52 for OFDM transmitting with spectral holes as contemplated by the present invention. In a first step, data bits may be inputted and converted into symbols in a second step. In a third step, the symbols may be placed at pre-assigned subcarrier frequencies and also creating spectral holes with zero values. Also at this step, additional optional subcarrier frequencies (symbols) may be employed to provide forward error correction. At a fourth step, the symbols may be converted to the time domain with an IFFT. At a sixth step, a guard interval may be added, and at a seventh step the signal may be upconverted and transmitted at the same time (concurrently) as signals generated in process of FIG. 6.

Figure 8:
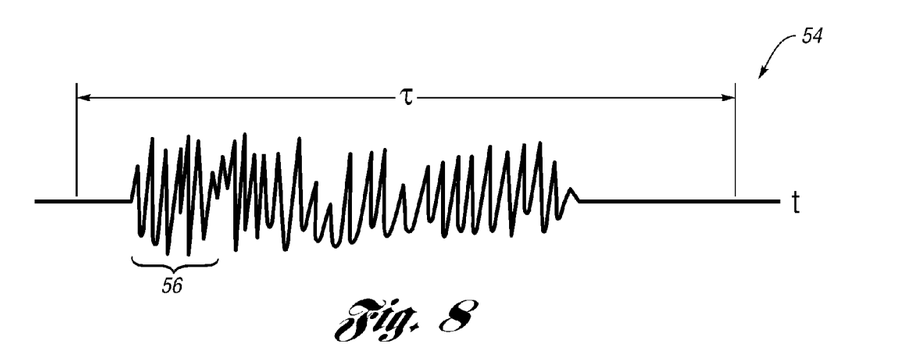
FIG. 8 illustrates a burst desired for transmission which may be utilized with pre-distortion in accordance with one non-limiting aspect of the present invention.
Figure 9:
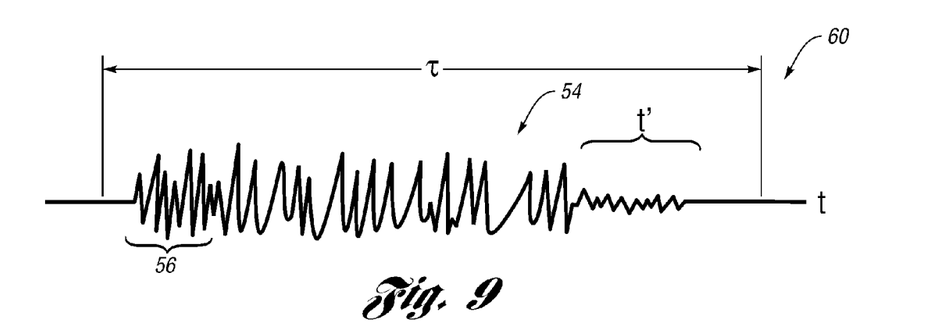
FIG. 9 illustrates addition of a pre-distortion to a burst in accordance with one non-limiting aspect of the present invention.
Figure 10:
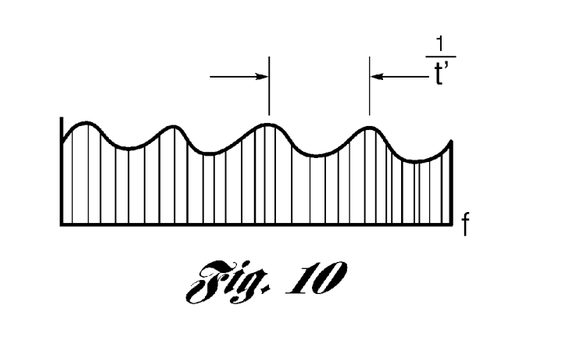
FIG. 10 illustrates the pre-distorted burst in the frequency domain in accordance with one non-limiting aspect of the present invention.

Another method of equalization that can be used for either PAM transmissions, OFDM transmissions or combined transmissions of PAM and OFDM is to employ frequency-domain pre-distortion. FIG. 8 illustrates a burst 54 desired for transmission which may be equalized with pre-distortion in accordance with one non-limiting aspect of the present invention. The burst 54 is shown within the time domain having a corresponding signaling desired for transport from one of the subscriber locations A, B, C. Optionally, in accordance with the dynamic guard interval processing noted above, the burst 54 is shown to include a guard interval 56 at a beginning. The burst 54 is shown to have a duration $T$ for transmission. FIG. 9 illustrates a combined signal 60 having the contemplated pre-distortion by adding a pre-distortion $t^1$ to an end of the burst 54 such that the combined signal 60 includes the guard interval 56 at the beginning in the pre-distortion $t^1$ at and ending. The pre-distortion $t^1$ may correspond with an inverse of the duration of an echo or other attenuation measured between the headend 14 between the transmitting devices, which may be determined in a testing operation where test signals are communicated and/or by monitoring locations from the device. FIG. 10 illustrates the combined signal 60 in the frequency domain.

The contemplated pre-distortion may be beneficial with a burst having a guard interval, (illustrated in FIG. 8) that is about to be transmitted such that may be converted into the frequency domain, and distorted with the inverse of the frequency domain distortion anticipated on the signal path (illustrated in FIG. 10). The signal may be converted back to the time domain for transmission (illustrated in FIG. 9). The trailing echo observed in FIG. 9 should never arrive at a receiver because it is cancelled by the echo created by a signal path. The transmission can be received equally well as one that was pre-distorted by a FIR filter but the large numbers of pre-distortion taps at the transmitter without the extreme cost required to properly use the FIR filters.

SC-FDMA (single carrier frequency domain multiple access), such as is used in the upstream LTE (long term evolution) specification, is a multiple access QAM transmission method. Each transmitter converts their symbols to the frequency domain. In the frequency domain the symbols are re-arranged to create spectral holes for the other QAM transmitters to use. The signals are converted back into the temporal domain for simultaneous transmission. For this method to work, all simultaneous users must have a same block length and a same guard interval. At the receiver the individual signals are reconstructed by removing the spectral holes in the frequency domain, equalization in the frequency domain and conversion back into the time domain.

As supported above, one non-limiting aspect of the present invention relates to a FDMA transmission system comprising multiple transmitters simultaneously in a frequency band using common transmission time, common guard interval duration, and frequency interleaving, where at least one of the transmitters is using OFDM and at least one of the transmitters is using PAM. The guard interval in the FDMA transmission system can use a variable duration guard interval where the guard interval duration is shortened when the longest echo in the signal path is short. The transmission system may employ low order modulation for at least one transmitter experiencing high in-band noise at the common receive site and high order modulation for at least one transmitter experiencing high in-band noise at the common receive site. Equalization can be accomplished using pre-distortion of a signal at a transmitter for both PAM and OFDM Transmissions.

As supported above, the equalization contemplated by the present invention may be beneficial in number of environments. For example, in cable (wired) environment a subscriber may use PAM when it is offered in order to take advantage of its low crest factor while also maintaining inability to use OFDM where it is offered in order to take advantage of its less signal processing. In a wireless environment, the OFDM advantages may include: MIMO (multiple antennas) processing, and COFDM for surviving deep fades that wipe out subcarriers.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of scheduling signal transmission for a plurality of devices configured to transmit signals through different transmission mediums to a combiner for combination into a common transmission medium, the method comprising:

determining attenuation associated with the different transmission mediums used by the plurality of devices to communicate with the combiner;
　　identifying a first device of the plurality of devices having attenuation within a first attenuation range;
　　identifying a second device of the plurality of devices having attenuation within a second attenuation range, the second attenuation range being less than the first attenuation range;
　　instructing the first device to transmit according to pulse amplitude modulation (PAM), including instructing the first device to convert to the frequency domain a first PAM carrier block used to convey the signal transmission, the first PAM being converted to create a first converted PAM carrier block having at least one spectral hole;
　　instructing the second device to transmit according to orthogonal frequency division multiplexing (OFDM), including instructing the second device to convert a second OFDM carrier block used to convey the signal transmission, the second OFDM carrier block being converted to create a second converted OFDM carrier block that fills at least one of the at least one spectral hole; and
　　instructing the first device and the second device to respectively transmit the first converted PAM carrier block and the second converted OFDM carrier block at a same frequency band, a same transmission block duration, and a same transmission block start time, thereby resulting in the combiner adding the first converted PAM carrier block with the second converted OFDM carrier block for transmission over the common transmission medium.

2. The method of claim 1 further comprising instructing the first device and the second device to respectively apply a same guard interval duration to the OFDM carrier block and the OFDM carrier block.

3. The method of claim 2 further comprising dynamically determining the same guard interval to be proportional to a greater one of the first and second attenuation ranges.

4. The method of claim 2 further comprising wherein the attenuation determined for the first and second devices includes measurement of associated echoes, and wherein the method further comprises determining the guard interval duration to be greater than a longest echo associated with the attenuation of the first and second devices.

5. The method of claim 1 further comprising:
　　identifying a third device of the plurality of devices having attenuation within the first attenuation range;
　　instructing the third device to transmit according to pulse amplitude modulation (PAM), including instructing the third device to convert to the frequency domain a third PAM carrier block used to convey the signal transmission, the third PAM carrier block being converted to create a third converted PAM carrier block that fills at least one of the at least one spectral hole of the first converted PAM carrier block; and
　　instructing the first device, the second device, and the third device to respectively transmit the first converted PAM carrier block, the second converted OFDM carrier block, and the third converted PAM carrier block at the same frequency band, the same transmission block duration, and the same transmission block start time, thereby resulting in the combiner adding the first converted PAM carrier block, the second converted OFDM carrier block, and the third converted PAM carrier block for transmission over the common transmission medium.

6. The method of claim 1 further comprising:
　　identifying a third device of the first plurality of devices having attenuation within the first attenuation range;
　　instructing the third device to transmit according to orthogonal frequency division multiplexing (OFDM), including instructing the third device to convert a third OFDM carrier block used to convey the signal transmission, the third OFDM being converted to create a third converted OFDM carrier block that fills at least one of the at least one spectral hole; and
　　instructing the first device, the second device, and the third device to respectively transmit the first converted PAM carrier block, the second converted OFDM carrier block, and the third converted OFDM carrier block at the same frequency band, the same transmission block duration, and the same transmission block start time, thereby resulting in the combiner adding the first converted PAM carrier block, the second converted OFDM carrier block, and the third converted OFDM carrier block for transmission over the common transmission medium.

7. The method of claim 1 further comprising identifying the second device to be one of a number of devices having attenuation within the second attenuation range, the second device being the one of the number of devices having attenuation most closely matched to attenuation of the first device.

8. The method of claim 1 further comprising instructing the first device to position at least one of the at least one spectral hole where interferers are located, the interferers corresponding with expected interferences within the transmission mediums such that at least one spectral hole is positioned relative to a frequency band expected to have interferences.

9. A method of scheduling signal transmission for a plurality of devices configured to transmit signals through different transmission mediums to a combiner for combination into a common transmission medium, the method comprising:
　　determining attenuation associated with the different transmission mediums used by the plurality of devices to communicate with the combiner;
　　instructing a first portion of the plurality of devices having attenuation within a first attenuation range to transmit at a first instance with a first guard interval such that the corresponding signal transmissions are added together at the combiner for transmission to the common transmission medium; and
　　instructing a second portion of the plurality of devices having attenuation within a second attenuation range to transmit at a second instance with a second guard interval such that the corresponding signal transmissions are added together at the combiner for transmission to the common transmission medium, the first attenuation being greater than and outside the second attenuation range, the second guard interval being less than the first guard interval.

10. The method of claim 9 further comprising wherein the attenuation determined for the plurality of devices includes measurement of associated echoes, and wherein the method further comprises determining the first guard interval to be greater than a longest echo associated with the attenuation of the first portion of the plurality of devices.

11. The method of claim 9 further comprising performing a ranging operation to determine the attenuation associated with the different transmission mediums used by the plurality of devices.

12. The method of claim 11 further comprising limiting the ranging operation to a third portion of the plurality of devices desiring signal transmission, the third portion including the first and second portions, the third portion desiring signal transmission being identified upon receipt of an electronic message requesting scheduling for signal transmission.

13. The method of claim 9 further comprising selecting the first portion from a third portion of the plurality of devices having attenuation within the first attenuation range, the first portion having a most closely matched attenuation of the third portion of the plurality of devices.

14. The method of claim 9 further comprising:
 instructing a first device of the first portion to transmit according to pulse amplitude modulation (PAM), including instructing the first device to convert to the frequency domain a first PAM carrier block used to convey the signal transmission, the first PAM carrier block being converted to create a first converted PAM carrier block having at least one spectral hole;
 instructing the second device of the first portion to transmit according to orthogonal frequency division multiplexing (OFDM), including instructing the second device to convert a second OFDM carrier block used to convey the signal transmission, the second OFDM being converted to create a second converted OFDM carrier block that fills at least one of the at least one spectral hole; and
 instructing the first device and the second device to respectively transmit the first converted PAM carrier block and the second converted OFDM carrier block at a same frequency band, a same transmission block duration, and a same transmission block start time, thereby resulting in the combiner adding the first converted PAM carrier block with the second converted OFDM carrier block for transmission over the common transmission medium.

15. A method of scheduling signal transmission for a plurality of devices, the method comprising:
 determining attenuation associated with different transmission mediums used by the plurality of devices;
 identifying a first device of the plurality of devices having attenuation within a first attenuation range;
 identifying a second device of the plurality of devices having attenuation within a second attenuation range, the second attenuation range being less than the first attenuation range;
 instructing the first device to transmit a first carrier block having at least one spectral hole;
 instructing the second device to transmit a second carrier block that fills at least one of the at least one spectral hole; and
 instructing the first device and the second device to respectively transmit the first and second carrier blocks at a same guard interval, a same frequency band, a same transmission block duration, and a same transmission block start time.

16. The method of claim 15 further comprising adding the first carrier block with a second carrier block with a combiner located upstream from both of the first and second devices.

17. The method of claim 15 further comprising measuring an echo associated with the different transmission mediums used by the first and second device and selecting the guard interval to be longer than each echo.

18. A method of facilitating removal of linear distortions associated with a signal burst issued from a transmitter to be carried over communication medium to a combiner for further transmission, the method comprising:
 determining an echo associated with the communication medium;
 adding a pre-distortion to an end of the signal burst, the pre-distortion corresponding with an inverse of the echo; and
 transmitting a combined signal over the communication medium, the combined signal including the signal burst and the pre-distortion.

19. The method of claim 18 wherein the burst is a pulse amplitude modulated (PAM) carrier and the method further comprises using frequency domain pre-distortion for the PAM carrier.

20. The method of claim 18 wherein the burst is an orthogonal frequency division multiplexing (OFDM) carrier and the method further comprises using frequency domain pre-distortion for the OFDM carrier.

* * * * *